(12) United States Patent
Ichikawa et al.

(10) Patent No.: US 7,556,664 B2
(45) Date of Patent: Jul. 7, 2009

(54) SEALED HONEYCOMB STRUCTURE AND METHOD OF PRODUCING THE SAME

(75) Inventors: Yukihito Ichikawa, Nagoya (JP); Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 516 days.

(21) Appl. No.: 10/548,813

(22) PCT Filed: Mar. 19, 2004

(86) PCT No.: PCT/JP2004/003736

§ 371 (c)(1), (2), (4) Date: Sep. 13, 2005

(87) PCT Pub. No.: WO2004/085029

PCT Pub. Date: Oct. 7, 2004

(65) Prior Publication Data

US 2006/0150598 A1 Jul. 13, 2006

(30) Foreign Application Priority Data

Mar. 25, 2003 (JP) .............................. 2003-083213

(51) Int. Cl.
*B01D 46/00* (2006.01)
*B01D 39/20* (2006.01)
*F01N 3/022* (2006.01)

(52) U.S. Cl. ..................... 55/523; 55/282.3; 55/385.3; 55/524; 55/DIG. 5; 55/DIG. 10; 55/DIG. 30; 95/273; 60/311; 264/628; 264/630; 264/631; 264/653; 264/662; 264/DIG. 48; 428/116

(58) Field of Classification Search ............... 55/282.2, 55/282.3, 385.3, 523, 524, DIG. 5, DIG. 10, 55/DIG. 30; 95/273; 60/311; 428/628, 630, 428/631, 653, 662, DIG. 48, 116, 117, 118; 264/628, 630, 631, 653, 662, DIG. 48

See application file for complete search history.

(56) References Cited

U.S. PATENT DOCUMENTS

| 4,293,357 | A | * | 10/1981 | Higuchi et al. | ............... 264/630 |
| 6,840,976 | B2 | * | 1/2005 | Vance et al. | ................. 55/523 |
| 7,090,714 | B2 | * | 8/2006 | Otsubo et al. | ............... 55/523f |

(Continued)

FOREIGN PATENT DOCUMENTS

JP       A 57-7215       1/1982

(Continued)

*Primary Examiner*—Jason M Greene
(74) *Attorney, Agent, or Firm*—Oliff & Berridge, PLC

(57) ABSTRACT

There is provided a plugged honeycomb structure 1 including: partition walls 2 disposed so as to form a plurality of cells 3 extending from one end face 42 to the other end face 44 in the axial direction, and plugged portions 4 disposed so as to plug the cells 3 at one of the end faces, and a production method thereof. In this honeycomb structure 1, the plugged portions 4 and partition walls surrounding the plugged portions are unitarily formed. The production method includes a forming step, a plugging step for filling a plugging material, and a firing step. The plugging material contains solid particles capable of unitarily joining with at least one kind of solid particles contained in a forming raw material in a firing step. A ratio of a dimensional change (%) upon forming the partition walls out of the partition wall-forming material to a dimensional change (%) upon forming the plugged portions out of the plugging material is controlled to be within the range of 0.7% to 1.3 in the firing step. There is provided a plugged honeycomb structure having further improved strength, adhesion, and thermal shock resistance between partition walls and plugged portions and a production method thereof.

12 Claims, 8 Drawing Sheets

U.S. PATENT DOCUMENTS 7,122,237 B2 10/2006 Hamanaka et al.
2003/0024219 A1* 2/2003 Harada et al. ................ 55/523

FOREIGN PATENT DOCUMENTS

| JP | A 57-42316 | 3/1982 |
| JP | A 59-54682 | 3/1984 |
| JP | 1-297114 * | 11/1989 |
| JP | A 1-297114 | 11/1989 |
| JP | A 5-137923 | 6/1993 |
| JP | 2001-300922 * | 10/2001 |
| JP | A 2001-300922 | 10/2001 |
| JP | A 2002-159811 | 6/2002 |
| JP | A 2002-173381 | 6/2002 |

\* cited by examiner

FIG. 1 (a)
FIG. 1 (c)
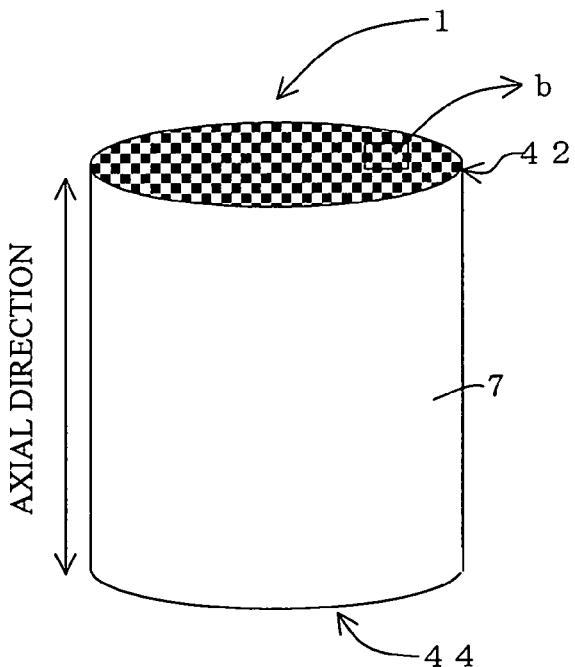
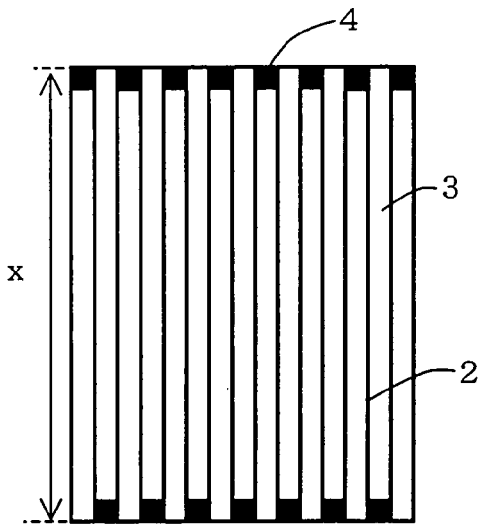
FIG. 1 (b)
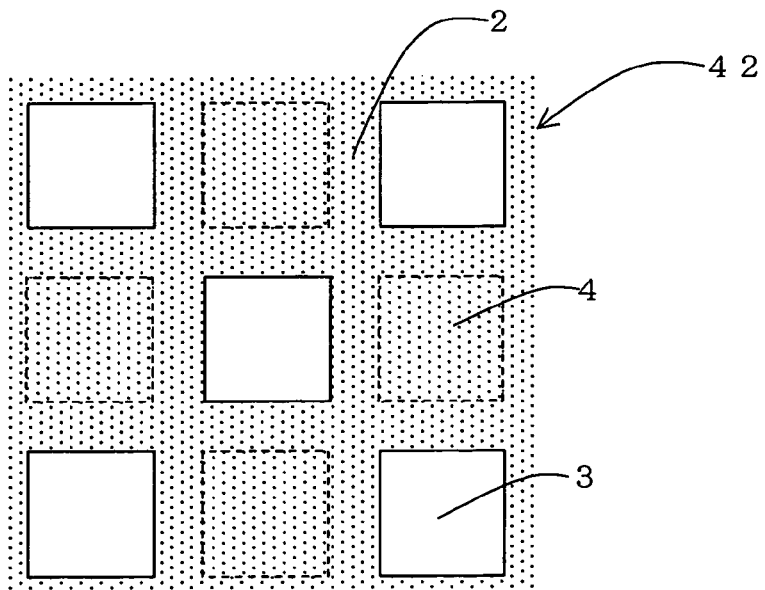

EXAMPLE

COMPARATIVE EXAMPLE

FIG. 9 (a)  Related Art
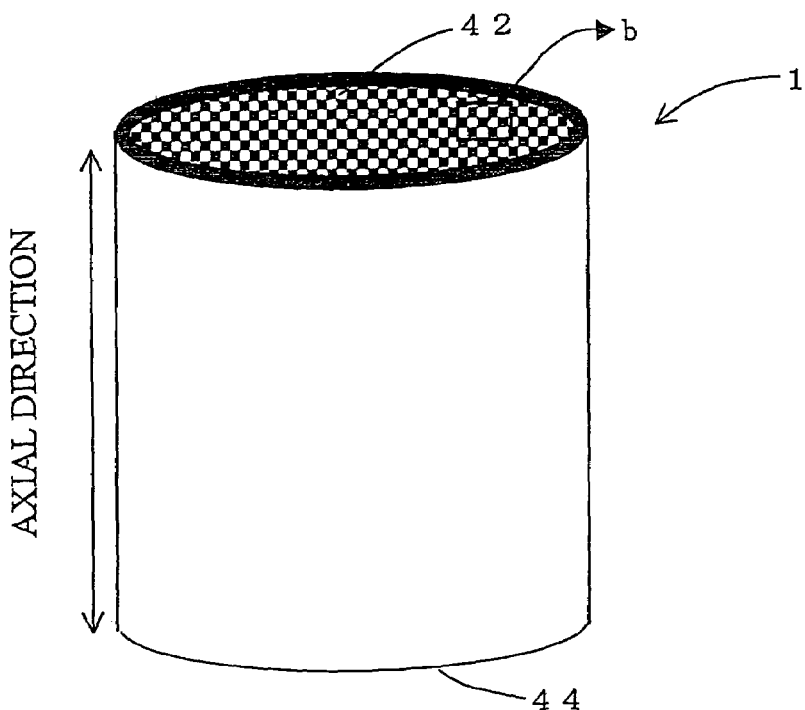
FIG. 9 (b)  Related Art       FIG. 9 (c)  Related Art
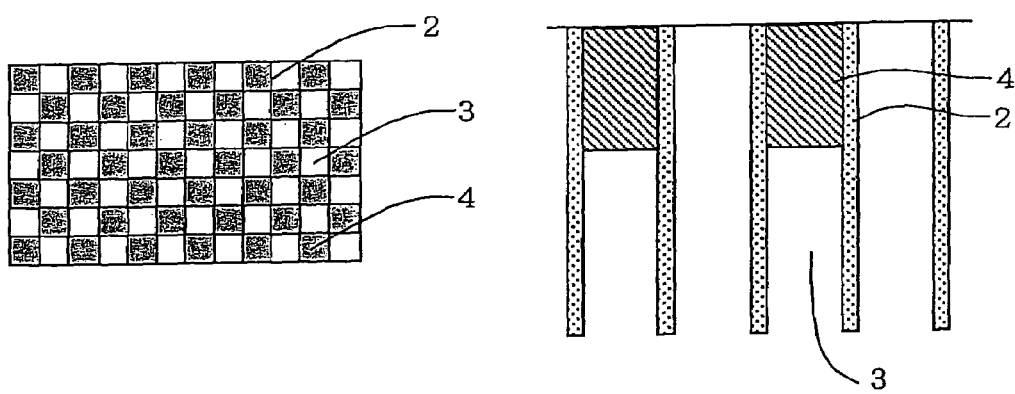

FIG. 10        Related Art
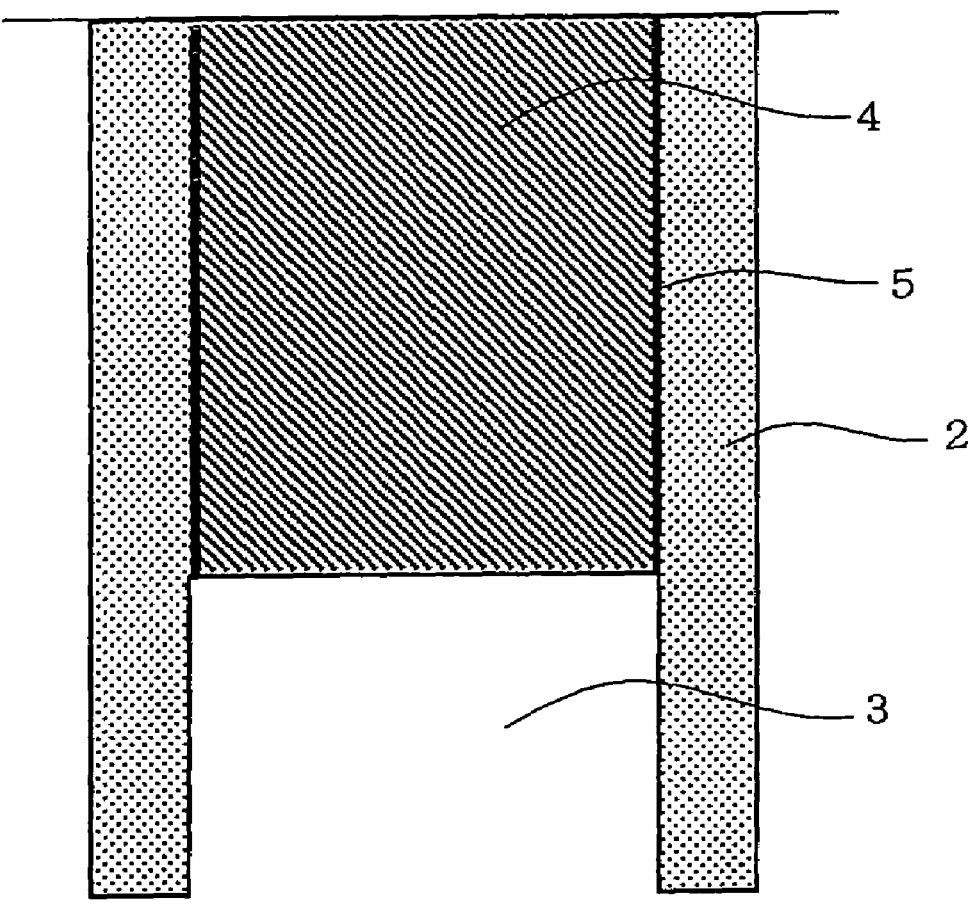

SEALED HONEYCOMB STRUCTURE AND METHOD OF PRODUCING THE SAME

TECHNICAL FIELD

The present invention relates to a sealed or plugged honeycomb structure usable for an exhaust gas purification filter, a water treatment filter, and a separation membrane filter and a production method thereof. In particular, the present invention relates to a plugged honeycomb structure having high strength, adhesion, and thermal shock resistance between partition walls and plugged portions.

BACKGROUND ART

When a honeycomb structure is used as an exhaust gas purification filter, as shown in FIGS. 9(a) to 9(c), the honeycomb structure is generally used in the form of a plugged honeycomb structure 1 provided with porous partition walls 2 disposed in such a manner that a plurality of cells 3 are extending from one end face 42 to the other end face 44 in an axial direction and plugged portions 4 disposed in such a manner that each of the cells 3 is plugged at one of the two end faces. By employing such a form, fluid to be treated flowing into cells from one end face 42 passes through the porous partition walls 2 and is discharged from the other end face 44 via other cells 3. At this time, the partition walls 2 function as a filter to trap particulate matter or the like.

Such a plugged honeycomb structure can generally be produced by producing a honeycomb structure with no plugged portion and subsequently forming plugged portions in predetermined cells. However, since various kinds of stress is prone to be applied on, for example, an interface portion 5 between the plugged portions 4 and the partition walls 2 shown in FIG. 10, a crack is prone to be caused in this portion. In addition, particulate matter such as soot in exhaust gas sometimes leaks out from a gap between a partition wall and a plugging portion during use of a plugged honeycomb structure as a diesel particulate filter (DPF), and when a DPF is washed by water with high pressure or compressed air in order to discharge outside the DPF particulate matter such as an ash component or a soot component accumulated inside the DPF after the DPF is used for an exhaust gas treatment, a plugged portion is sometimes detached from partition walls to move, and when a plugged portion moves too much, it is sometimes detached from the DPF.

For such problems, there is disclosed a honeycomb filter having a difference in thermal expansion coefficient between a honeycomb structure and plugged portions within a predetermined range, comprising: a mechanism of bonding with a plugging material filling up open pores present in partition walls of a honeycomb structure dried and fired after being formed, and a mechanism of engaging with through holes, and being characterized by substantially not interposing a reaction phase in a contact portion of the ceramic honeycomb structure and the plugged portion (see, for example, JP-A-57-42316).

As a plugging method in which firing is performed after plugging a honeycomb formed body before firing, there has been proposed a plugging method using ceramic particles and an auxiliary for fluidizing the ceramic particles as a plugging material and being characterized in that the auxiliary has the property of not dissolving again the binder contained in the honeycomb formed body (see JP-A-2002-173381). This method aims to suppress deformation or dissolution of a honeycomb formed body upon immersing the honeycomb formed body in a plugging material.

DISCLOSURE OF THE INVENTION

The present invention is characterized by providing a plugged honeycomb structure having further improved strength, adhesion, and thermal shock resistance between partition walls and plugged portions and a production method thereof.

In the present invention, the aforementioned conventional techniques were investigated in detail, and, as a result, the following knowledge was obtained. That is, in the aforementioned techniques, because of low affinity between the plugged portions and partition walls surrounding the plugged portions, an interface was present in an interface portion 5 between the plugged portions 4 and the partition walls 2 surrounding the plugged portions 4 and had week intrinsic bonding force. Therefore, in order to maintain the plugged portions in cells, it was necessary for a volume of the plugged portions to expand to some extent, thereby press-widening the peripheral partition walls to utilize reactive force thereof. Therefore, a residual stress is generated in the peripheral partition wall as a side effect to lower the strength against a thermal stress.

Therefore, the present inventors found out that by improving affinity between plugged portions and partition walls surrounding the plugged portions, and further unitarily joining plugged portions and partition walls surrounding the plugged portions, intrinsic bonding force can be imparted to the portion between plugged portions and partition walls surrounding the plugged portions; and strength, adhesion, and thermal shock resistance sufficient for maintaining the structure even under severe conditions can be imparted to the structure. They also found out that plugged portions and partition walls surrounding the plugged portions can be unitarily joined by a specific method.

That is, according to the present invention, there is provided a plugged honeycomb structure comprising:

partition walls disposed so as to form a plurality of cells extending from one end face to the other end face in an axial direction, and plugged portions disposed so as to plug the cells at one of the end faces, wherein the plugged portions and said partition walls surrounding said plugged portions are unitarily formed.

In the present invention it is preferable that a length of the plugged portions in a longitudinal direction of the cells is ten times as long as a cell pitch or less and that the length of the plugged portions in the longitudinal direction of the cells is two times as long as a thickness of the partition walls or more.

According to the present invention, there is further provided a method for producing a plugged honeycomb structure, comprising:

a forming step of forming a forming raw material containing a solid particle (A) into a honeycomb formed body provided with a partition wall-formed body disposed so as to form a plurality of cells extending from one end face to the other end face in an axial direction, a plugging step of filling a plugging material containing a solid particle (B) into end portions of cells of the honeycomb formed body to form a plugged honeycomb formed body, and a firing step of firing the plugged honeycomb formed body to form a plugged honeycomb structure provided with partition walls formed out of the partition wall-formed body and plugged portions formed out of the plugging material;

wherein the solid particle (A) and the solid particle (B) can unitarily be formed mutually in the firing step, and a difference between rate of dimensional change (%) upon forming the plugged portions out of the plugging material and rate of dimensional change (%) upon forming the partition walls out of the partition wall-forming material is controlled to be 7% or less within the temperature range of the firing in the firing step.

In the present invention, the method preferably further comprises a cooling step of cooling the plugged honeycomb structure, and a ratio of thermal expansion coefficient of the plugged portions to thermal expansion coefficient of the partition walls is made to be preferably 0.3 to 3.0%, further preferably 0.5 to 2.0, particularly preferably 0.7 to 1.4 in the temperature range of the cooling in the cooling step. In addition, it is preferable that the plugging step includes a step of filling the plugging material from one end face of the honeycomb structure with pressurizing inside the cells from the other end face and that the forming raw material contains a binder, and the plugging material contains a binder compatible with the binder contained in the forming raw material. It is also preferable that the forming raw material contains a binder, and after the forming step, an end face of the honeycomb formed body is heated at 200° C. or more to remove at least a part of the binder, followed by conducting the plugging step at the end face. It is also preferable that the forming raw material is a slurry containing a dispersion medium (C), and the plugging material is a slurry containing a dispersion medium (D) compatible with the dispersion medium (C) and further preferable that the honeycomb formed body is dried, subsequently, the partition wall-formed body is impregnated with the dispersion medium (C) in the vicinity of an end face, followed by conducting the plugging step at the end face. Alternatively, it is also preferable that the dispersion medium (C) and the dispersion medium (D) are hydrophobic, and the plugging step is conducted under the condition that temperature of the partition wall-formed body is higher than the normal temperature in the vicinity of an end portion.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1(a) is a schematic perspective view showing an embodiment of a plugged honeycomb structure of the present invention, FIG. 1(b) is a schematic partially enlarged plan view showing b portion of FIG. 1(a), and FIG. 1(c) is a schematic parallel sectional view of FIG. 1(a).

FIG. 9(a) is a schematic perspective view showing a conventional plugged honeycomb structure, FIG. 9(b) is a schematic partially enlarged plan view showing b portion of FIG. 9(a), and FIG. 9(c) is a schematic parallel sectional view of FIG. 9(a).

FIG. 10 is a schematic partially enlarged sectional view showing a conventional plugged honeycomb structure.

BEST MODE FOR CARRYING OUT THE INVENTION

Figure 2:
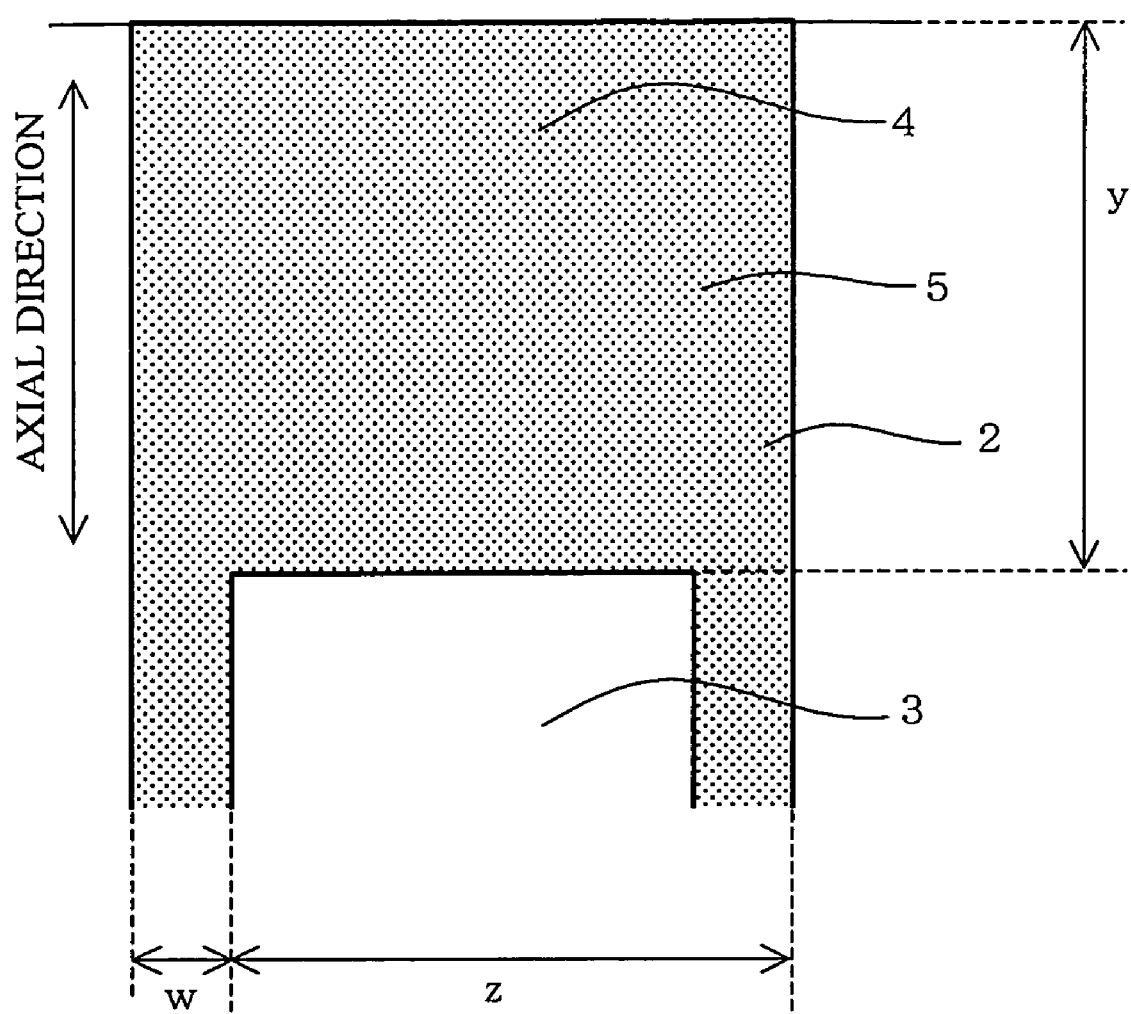
FIG. 2 is a schematic partially enlarged parallel sectional view showing another embodiment of a plugged honeycomb structure of the present invention.

A plugged honeycomb structure and a production method thereof of the present invention will hereinbelow be described in detail on the basis of specific embodiments. However, the present invention is by no means limited to the following embodiments. Incidentally, in the following description, a section orthogonal with an axial direction (e.g., axial direction shown in FIG. 1) is referred to as an orthogonal section, and a section parallel with an axial direction is referred to as a parallel section.

As shown in FIGS. 1(a) to 1(c), a plugged honeycomb structure 1 of the present invention is provided with partition walls 2 disposed so as to form a plurality of cells 3 extending from one end face 42 to the other end face 44 in the axial direction and plugged portions 4 disposed so as to plug the cells 3 at one of the end faces.

An important characteristic of a plugged honeycomb structure of the present invention is that the plugged portions 4 and the partition wall 2 surrounding the plugged portions are unitarily formed as shown in FIG. 2. By the unitary formation, even in the case that an excessive force is applied from a longitudinal direction (axial direction) of cells to the plugged portions, a possibility that the plugged portions come off in the direction can be reduced. In addition, since the plugged portions can be held in the cells with sufficient strength even without using volume expansion of the plugged portions, a residual stress is not prone to be generated on partition walls surrounding the plugged portions, thereby improving thermal shock resistance. Therefore, even in the case that the honeycomb structure is put under severe temperature conditions, a crack is not prone to be caused in the interface portion 5 and partition walls 2 surrounding the interface portion. In addition, a possibility that an untreated fluid leaks out from an interface portion 5 between a plugged portion 4 and a partition wall 2 surrounding the plugged portion is markedly reduced.

In the present invention, "plugged portions and partition walls surrounding the plugged portions are unitarily formed" means there is no structural interface between the plugged portion 4 and the partition wall 2 surrounding the plugged portion. It means, for example, in the case that a parallel section in a portion of the partition wall 2 surrounding the plugged portion 4 is observed, no interface line is observed and one phase is present in such a manner that it extends over both the plugged portion 4 and the partition wall 2 surrounding the plugged portion as shown in FIG. 2. For example, since a reaction phase is not interposed substantially at the interface in a relation of a plugged portion and a partition wall surrounding the plugged portion disclosed in JP-A-57-42316, a structural interface is observed between the plugged portion and the partition wall surrounding the plugged portion even with the plugged portion entering an open pore of the partition wall. In contrast, since plugged portions and partition walls surrounding the plugged portions are unitarily formed by, for example, melting by firing in a plugged honeycomb structure of the present invention, such a structural interface is not observed.

In the present invention, there is no particular limitation to a length y of the plugged portions 4 in a longitudinal direction (axial direction) of the cells 3 shown in FIG. 2. However, since a plugged honeycomb structure of the present invention has high bonding force between the plugged portions and the partition walls surrounding the plugged portion, it is not required to make the length y of the plugged portions long. In addition, as the length y of the plugged portions become larger, a thermal stress concentrates more easily to lower thermal shock resistance when the plugged honeycomb structure has high temperature. Particularly, when bonding force between plugged portions and partition walls surrounding the plugged portions like a plugged honeycomb structure of the present invention, rigidity is high in the plugging portions of the plugged honeycomb structure, and when the length y of the plugged portion is made large in such cases, thermal shock resistance is prone to be lowered. Therefore, in the present invention, the length y of the plugged portion is preferably 10 times or less, more preferably 5 times or less, of a cell pitch. Here, a cell pitch means a length shown by Z in FIG. 2 and a length of one cell as a repeated unit. In addition, in the case that a plugged honeycomb structure of the present invention is used as a filter, it is not preferable that the structure has too large length y of a plugged portion because a partition wall has a small filtration area. From this viewpoint, the length y of a plugged portion is preferably 10% or less, more preferably 5% or less, of a length x in a longitudinal direction of a cell shown in FIG. 1(a). The technique of unitarily forming the partition walls and the plugged portions of the present invention makes it possible to shorten the length of the plugged portions and to improve thermal shock resistance, thereby realizing reduction in pressure loss.

When the length y of a plugged portion is too small, even a plugged honeycomb structure of the present invention sometimes has insufficient strength against pressure from a longitudinal direction of cells. Therefore, the length y of a plugged portion is preferably 2 times or more, more preferably 4 times or more, the thickness of partition walls W. However, in the case that the pressure from a longitudinal direction is small enough to be ignored, the above lower limit of a length of a plugged portion does not apply to this case. For example, as an extreme case, it is possible to make the length of a plugged portion substantially zero by attaching a thin sheet formed by a plugging material to an inlet of cells in an end face of a honeycomb structure and unitarily forming the plugged portion with the partition walls in the present invention.

In a plugged honeycomb structure of the present invention, there is no particular limitation to a shape or a material as long as it has partition walls 2 disposed so as to form a plurality of cells 3 extending from one end face 42 to the other end face 44 and plugged portions 4 disposed so as to plug the cells 3 at one of the end faces, for example, as shown in FIGS. 1(a) to 1(c). A shape of an orthogonal section of a plugged honeycomb structure can suitably be selected according to use or a place where the structure is placed and is, for example, a circle, an ellipse, a racetrack shape, or a quadrangle. A shape of an orthogonal section of a cell can be, for example, a polygon such as a triangle, a quadrangle, and a hexagon, a circle, or a substantial circle such as an ellipse. A cell density can be made to be, for example, 6 to 2000 cell/inch$^2$ (0.9 to 311 cell/cm$^2$), preferably about 50 to 1000 cell/inch$^2$ (7.8 to 155 cell/cm$^2$). In addition, as shown in FIGS. 1(a) to 1(c), it is preferable that adjacent cells have plugged portions 4 on mutually opposite end faces, and the plugged portions are disposed so that each of the end faces 42, 44 forms a checkerwise pattern. In addition, though there is no limitation to a material for plugged portions and partition walls, ceramic or metal is preferable from the view point of thermal resistance, and particularly, ceramic is preferable. Further, the plugged portions and partition walls surrounding the plugged portions preferably contain the same metal or ceramic in order that the plugged portions and partition walls surrounding the plugged portions may effectively be unitarily formed. In addition, a plugged honeycomb structure of the present invention is preferably provided with an outer peripheral wall 7 surrounding an outer periphery of the partition walls. When a plugged honeycomb structure of the present invention is used as a catalyst support or a filter, the partition walls and the outer peripheral wall are preferably porous.

Next, a production method for suitably producing a plugged honeycomb structure of the present invention will be described. A production method of the present invention includes a forming step for forming a forming raw material containing a solid particle (A) into a honeycomb formed body, a plugging step of plugging cells with a plugging material containing a solid particle (B), and a firing step of firing the plugged formed body to obtain a plugged honeycomb structure.

The important characteristics of the present invention are that the solid particle (A) contained in the forming raw material and the solid particle (B) contained in the plugging material are solid particles capable of being unitarily joined mutually in the firing step and that a difference between rate of dimensional change (%) upon forming the plugged portions out of the plugging material and rate of dimensional change (%) upon forming the partition walls out of the partition wall-forming material is controlled to be 7% or less, preferably 5% or less, more preferably 3% or less, within the temperature range of the firing in the firing step. Here, a difference between rates of dimensional change (%) means a value obtained by subtracting the smaller rate of dimensional change (%) from the larger rate of dimensional change (%) between the two rates of dimensional change (%). For example, when a rate of dimensional change (%) is 4 (%), and the other rate of dimensional change (%) is 10 (%), the difference in rate of dimensional change (%) is 6 (%).

By the production method, the plugged portions and the partition walls surrounding the plugged portions can unitarily be formed. For example, at least a part of a solid particle (B), for example, a ceramic particle contained in a plugging material for forming plugged portions and at least a part of a solid particle (A), for example, a ceramic particle contained in a forming raw material for forming partition walls surrounding the plugged portions are melted in the firing step to be unitarily formed, thereby the plugged portions and the partition walls surrounding the plugged portions can unitarily be formed.

However, the plugged portions and the partition walls surrounding the plugged portions cannot unitarily be formed only by unitarily joining the solid particle (A) contained in the forming raw material and the solid particle (B) contained in the plugging material. That is, by the difference between a dimensional change caused when the plugging material is changed into plugged portion by firing and a dimensional change caused when the forming raw material is changed into the partition walls by firing, stress is applied to the interface portion between the range of the plugged portions and the range of the partition walls during firing, and thereby the unitary formation is hindered. Therefore, by controlling the absolute value of a difference between rate of dimensional change (%) upon forming the plugged portions out of the plugging material and rate of dimensional change (%) upon forming the partition walls out of the partition wall-forming material to be 7% or less, preferably 5% or less, more preferably 3% or less, within the temperature range of the firing in the firing step, at least a part of the solid particles (A) and (B) can be unitarily joined, and the plugged portions and the partition walls surrounding the plugged portions can be unitarily formed.

Figure 3:
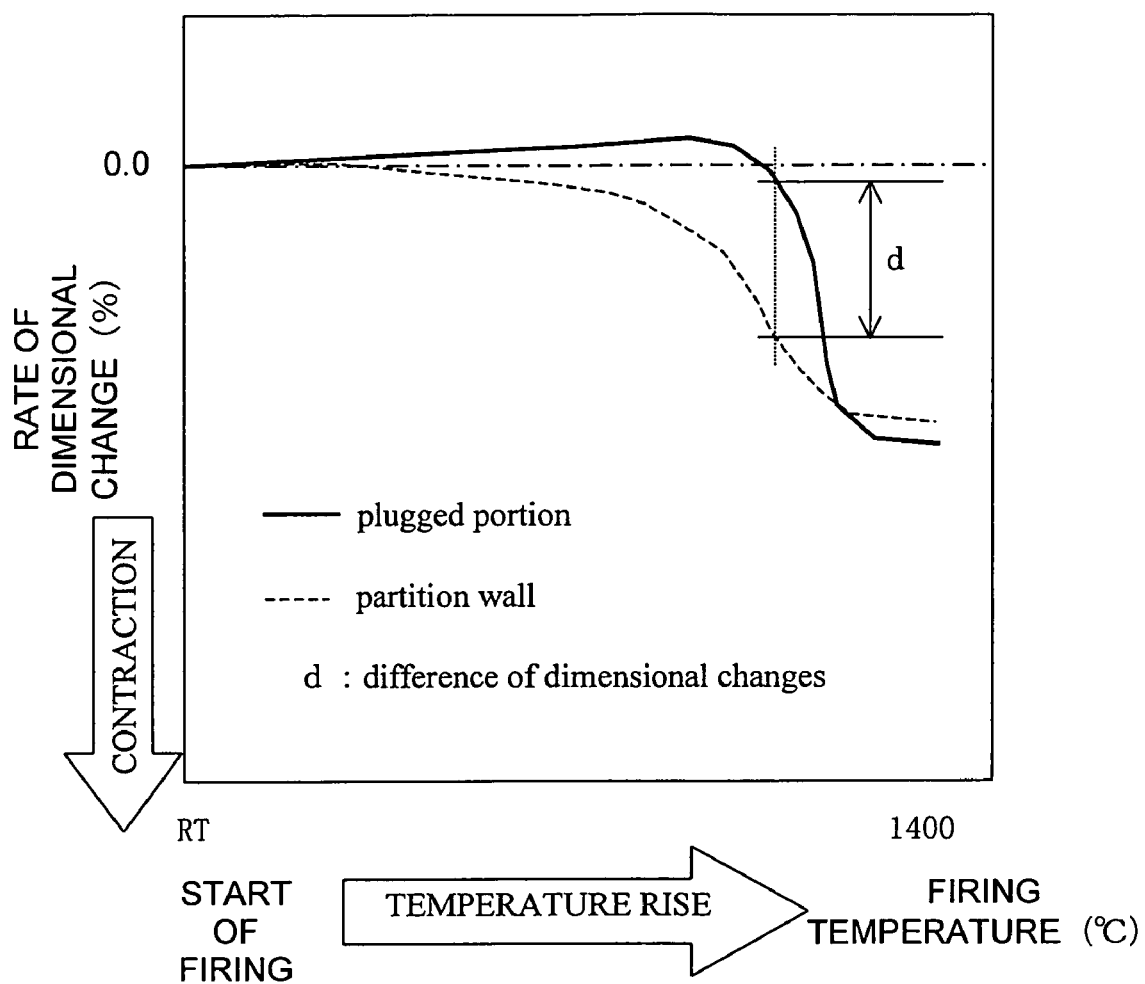
FIG. 3 is a diagram schematically showing a relation between temperature and change in dimensions in a production method of a plugged honeycomb structure of the present invention.
Figure 4:
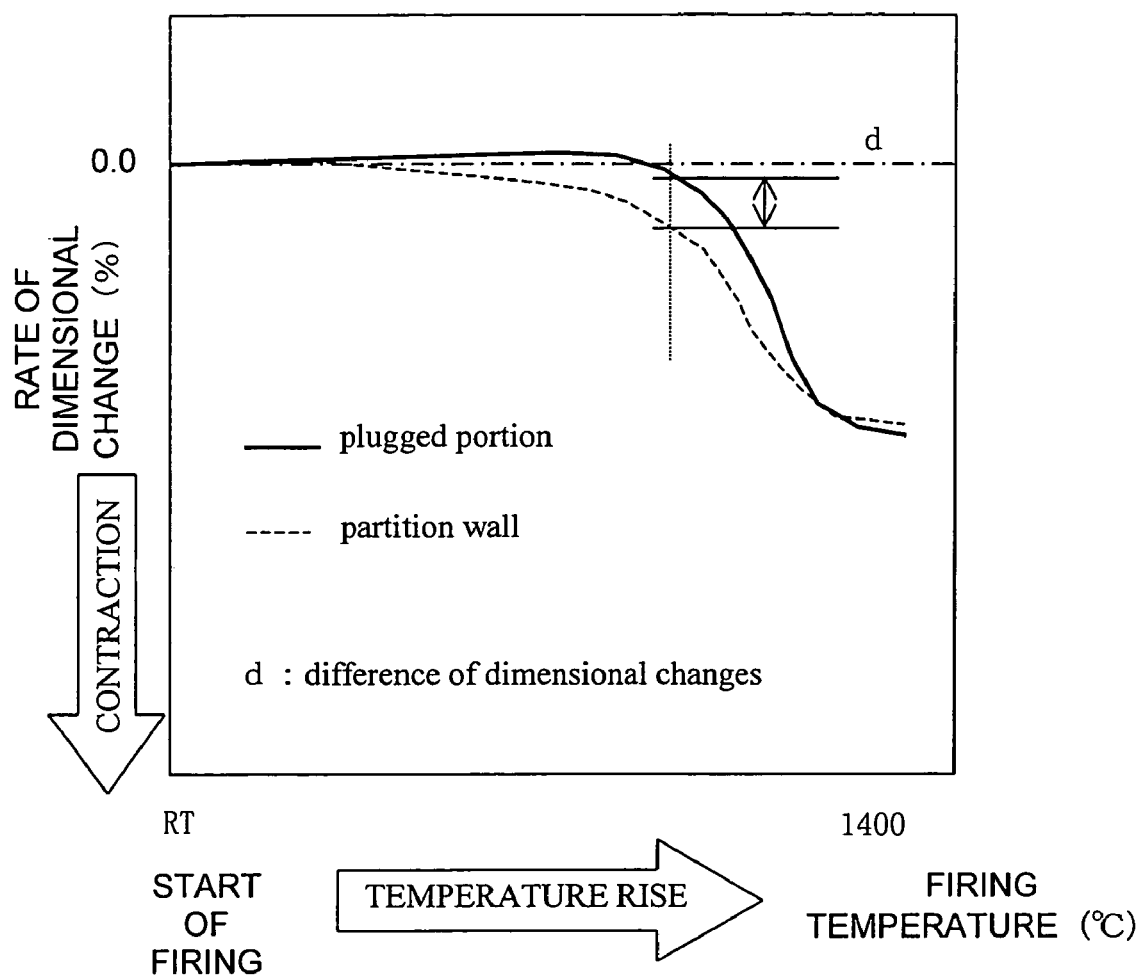
FIG. 4 is a diagram schematically showing a relation between temperature and change in dimensions in a present production method of a plugged honeycomb structure.

FIGS. 3 and 4 are diagrams showing examples of relations between rate of dimensional change (%) and temperature of partition walls and plugged portions in a conventional production method and a production method of the present invention, respectively. By controlling a difference in rate of dimensional change shown in these diagrams to be within the above range, the plugged portion and the partition walls surrounding the plugged portions can be unitarily formed. Though the difference in rate of dimensional change is ideally zero, it is not necessarily zero as shown in FIG. 4. When it is not zero, a residual stress is generated. The influence of the residual stress to strength, thermal shock resistance, and the like of a plugged honeycomb structure varies depending on a contact area of the plugged portions to the partition walls, the size of the plugged honeycomb structure itself, and the like. The contact area varies depending on the size of an orthogonal section of the cells and a length y of the plugged portions. Therefore, it is preferable to rationalize the difference in rate of dimensional change between two portions to be within the above range in consideration of a level of stress acting on the plugged portions under conditions of practical use.

In order to control the difference in rate of dimensional change to be within the above range, it is preferable, for example, to make a particle size distribution of solid particles contained in the forming raw material close to that of solid particles contained in the plugging material, further to make it almost the same, or to adjust a temperature-rising speed. Incidentally, the dimensional change here means any of the dimensional changes caused by contraction or expansion. However, in firing solid particles such as ceramic particles to form a fired body, most of the changes are caused by contraction. For example, in the case of producing a cordierite-based plugged honeycomb structure, contraction increases at 1000° C. or more where sintering of ceramic particles starts as shown in FIGS. 3 and 4. Therefore, it is important to control a difference in contraction percentage at 1000° C. more to be within the above range. Incidentally, the period for controlling the absolute value of a difference between rate of dimensional change (%) upon forming the plugged portions out of the plugging material and rate of dimensional change (%) upon forming the partition walls out of the partition wall-forming material to be 7 or less, preferably 5 or less, more preferably 3 or less, within the temperature range of the firing is the period from the start of firing to the completion of maintaining the highest temperature.

In the present invention, it is preferable that the method further includes a cooling step of cooling the plugged honeycomb structure after the firing step, and that a ratio of thermal expansion coefficient of the plugged portions to thermal expansion coefficient of the partition walls is controlled to be 0.3 to 3.0, preferably 0.5 to 2.0, more preferably 0.7 to 1.4 in the temperature range of the cooling in the cooling step. In the cooling step, high temperature of a plugged honeycomb structure in the firing step is returned to the normal temperature. At this time, the plugged honeycomb structure generally contracts. Accordingly, a too large difference in dimensional change between the plugged portion and the partition walls surrounding the plugged portions causes separation of unitarily joined solid particles and hinders unitary formation of the plugged portions and the partition walls surrounding the plugged portions. Therefore, by controlling thermal expansion coefficients of both the plugged portions and the partition walls to be within the above range, a plugged honeycomb structure having unitarily formed plugged portions and partition walls surrounding the plugged portions can suitably be obtained. For example, since the highest temperature is 1400° C. or more when a cordierite plugged honeycomb structure is produced, thermal expansion coefficient in the range from 1400 to 800° C. is more important. Also because of the large rate of change in thermal expansion coefficient, the ratio of thermal expansion coefficient of partition walls to the thermal expansion coefficient of plugged portions is preferably within the range of 0.7 to 1.4. For a thermal expansion coefficient of plugged portions, there can be used a value obtained by forming a plate having dimensions of about 6 cm×6 cm (sides)×6 mm (thickness) with a slurried plugging material, drying and firing the plate, cut out a square prism-shaped sample having dimensions of about 3 mm×3 mm (sides)×50 mm (length) from the plate, and measuring a thermal expansion curve (a rate of dimensional change (ΔL/L) per unit temperature change (° C.) under a fixed pressure) within the temperature range from 40° C. to 1400° C. with a thermal expansion measuring apparatus. For a thermal expansion coefficient of partition walls of a honeycomb structure, there can be used a value obtained in the manner similar to the case of the plugging material by cut out a square prism-shaped sample having dimensions of about 3 mm×3 mm (in a direction toward inside the partition walls)×50 mm in a direction perpendicular to the cell passages.

Next, each step is described. The forming step can be conducted as follows: There is employed as a solid particle (A) a powder of a material selected from various ceramics such as cordierite, mullite, alumina, spinel, zirconia, silicon carbide, silicon carbide-cordierite based composite material, silicon nitride, lithium aluminum silicate, and aluminum titanate, and metals such as Fe—Cr—Al based material, and combinations thereof. To the solid particle (A) is preferably added a binder such as methyl cellulose or hydroxypropoxylmethyl cellulose, then it is preferably to further add a dispersion medium (C), for example, water to prepare a forming raw material. This is made to be clay having plasticity, and then, the clay is extruded to give a honeycomb shape, and thereby a honeycomb formed body having partition walls to form a plurality of cells extending from one end face to the other end face in an axial direction can be formed. Incidentally, to the forming raw material may be added a desired additive as necessary. The additive may be a binder, a dispersant for accelerating dispersion to a dispersion medium, a pore former for forming pores, or the like. Examples of the binder include hydroxypropylmethyl cellulose, methyl cellulose, hydroxyethyl cellulose, carboxylmethyl cellulose, poly(vinyl alcohol), poly(ethylene terephthalate), polyethylene, and glycerol. Examples of the dispersant include ethylene glycol, dextrin, fatty acid soap, and polyalcohol. Examples of the pore former include graphite, flour, starch, phenol resin, and poly(ethylene terephthalate). These additives may be used alone or in combination according to the purpose. In addition, the forming raw material may include another solid particle besides the solid particle (A). The solid particle is preferably selected from the above examples of the solid particle (A).

Figure 5:
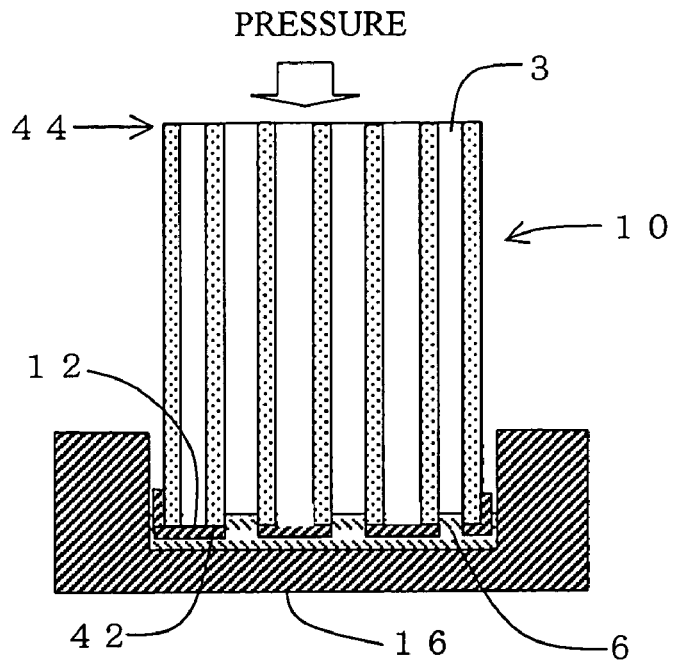
FIG. 5 is a schematic parallel sectional view for explaining a plugging step in a production method of the present invention.

In the plugging step, for example, a binder, a dispersion medium (D) or the like is preferably added to a firing material containing a solid particle (B) capable of unitarily joined with the solid particle (A) contained in the aforementioned forming raw material to prepare slurry, which is then put in a container 16 as shown in FIG. 5. Then, a honeycomb formed body 10 whose cells except for the cells to be plugged by the plugging material were masked with a masking member 12 at an end face 42 is immersed in the plugging material 6 to fill the plugging material in the end portions of the predetermined cells. The solid particle (B) is preferably selected from the examples of the solid particle (A) and more preferably the same kinds as the solid particle (A). The plugging material may contain another solid particle besides the solid particle (B). Another solid particle is preferably selected from the above examples of the solid particle (A).

Figure 6:
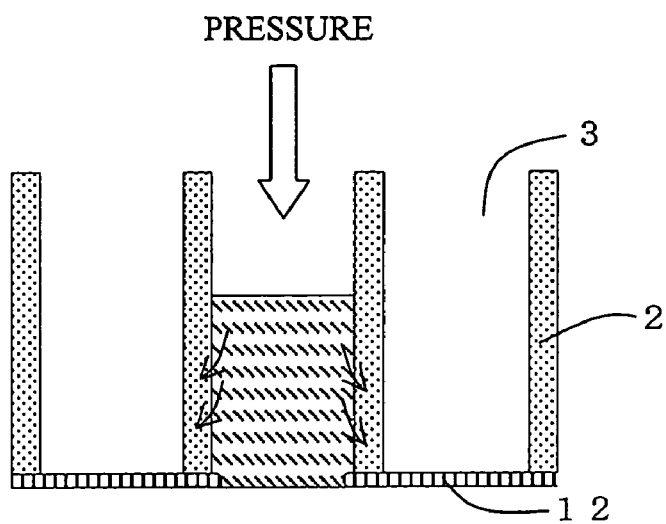
FIG. 6 is a schematic parallel sectional view for explaining a preferable plugging step in a production method of the present invention.

At this time, it is preferable to apply pressure inside cells from the side of the end face 44 which is not immersed in the plugging material. Applying pressure into inside cells makes permeation of the plugging material 6 easier as shown in FIG. 6, and thereby, unitary joining of the plugged portions and the partition walls surrounding the plugged portions in the following firing step is made easier. The pressure applied is preferably 0.1 to 10 $kg/cm^2G$.

In addition, the forming raw material in the forming step preferably contains a binder, and the plugging material preferably contains a binder capable of compatible with the binder contained in the forming raw material and more preferably contains the same binder. When the plugging material and the forming raw material contain such a binder, the plugging material can easily be permeate in partition wall-formed body surrounding the plugged portions, and thereby unitary joining of the plugged portions and the partition walls surrounding the plugged portions in the following firing step is made easier. A binder contained in the plugging material and the forming raw material may be selected from the aforementioned examples of a binder.

It is generally preferable to remove the dispersion medium to some extent by drying a honeycomb formed body after the forming step and before the plugging step from the viewpoint of inhibiting deformation. In addition, when the forming raw material contains a binder, it is preferable that an end face of a honeycomb formed body is heated at 200° C. or more, preferably 300° C. or more after the forming step to remove at least a part of the binder present in the vicinity of the end face, followed by the plugging step at the end face. By removing the binder in the partition wall-formed body which will be in contact with the plugging material, a void is formed in the partition wall-formed body, and the plugging material can easily be permeated in the partition wall-formed body in the periphery thereof. This makes unitary forming of the plugged portions and the partition walls surrounding the plugged portions easier in the following firing step. In this case, it is necessary to heat at least an end face, and the whole honeycomb formed body may be heated.

In the case that the forming raw material is slurry containing a dispersion medium (C), the plugging material is slurry containing a dispersion medium (D) compatible with the dispersion medium (C). Also because of this, the plugging material can easily be permeate in the partition wall-formed body in the periphery thereof, and thereby making unitary forming of the plugged portions and the partition walls surrounding the plugged portions easier in the following firing step. For example, it is preferable that the dispersion medium (C) and the dispersion medium (D) are water or hydrophilic mediums or that the dispersion medium (C) and the dispersion medium (D) are hydrophobic mediums such as oil and wax. It is further preferable that the dispersion medium (C) and the dispersion medium (D) are the same medium.

In addition, it is preferable to dry a honeycomb formed body before the plugging step. For example, in the case that the dispersion medium (C) is water, almost all the dispersion medium (C) is removed by drying in some cases. In such a case, the dispersion medium (C) is made to be contained again in the partition wall-formed body in the vicinity of the end face, that is, in the portion, in contact with the plugging material upon filling the plugging material, of the partition wall-formed body by means of spraying or the like, and the plugging step is conducted using a plugging material containing a dispersion medium (D) compatible with the dispersion medium (C) or a dispersion medium (D) which is the same as the dispersion medium (C). The presence of the mutually compatible dispersion mediums in the plugging material and the partition wall-formed body in the periphery thereof to some extent makes easier the permeation and mixing of components contained in the plugging material and the partition wall-formed body, and this makes unitary forming of the plugged portions and the partition walls surrounding the plugged portions easier in the following firing step.

In the case that the dispersion medium (C) and the dispersion medium (D) are hydrophobic, particularly, oil, wax, or the like, the plugging step is preferably conducted by heating the partition wall-formed body in the vicinity of the end face, that is, the portion, in contact with the plugging material upon filling the plugging material, of the partition wall-formed body to a predetermined temperature or higher. This makes easier the permeation and mixing of components contained in the plugging material and the partition wall-formed body, and this makes unitary forming of the plugged portions and the partition walls surrounding the plugged portions easier in the following firing step. Preferable heating temperature here is 100 to 300° C., and the plugging step is preferably conducted within this temperature range.

The firing temperature can be conducted by raising temperature of the plugged honeycomb formed body formed in the above step in a predetermined firing atmosphere up to the temperature where the solid particles used are sintered or reacted and maintaining the temperature for a predetermined time. Firing temperature and atmosphere may suitably be changed depending on solid particles used, and those skilled in the art can select the firing temperature and atmosphere optimum for the solid particles used. For example, in the case of using a cordierite-forming raw material, firing can be conducted at the highest temperature of 1400 to 1450° C. in the ambient atmosphere after degreasing in the ambient atmosphere; and in the case of using a silicon carbide powder and a metallic silicon powder as a raw material, firing can be conducted at the temperature of about 1550° C. in an Ar atmosphere after degreasing in a $N_2$ atmosphere. For the firing, a single furnace or a continuous furnace such as a tunnel furnace is generally used, and degreasing and firing can be conducted simultaneously here. Though it is considered that a temperature rising speed and a cooling speed are not necessarily essential problems in the present invention, it is necessary to optimize a temperature rising speed and a cooling speed to uniformalize a temperature distribution inside a product depending the size of a product to be fired to realize uniform firing contraction and cooling contraction, and a temperature rising speed and a cooling speed are very important factors in production.

The present invention is hereinbelow described with referring to Examples more specifically. However, the present invention is by no means limited to these Examples.

EXAMPLE AND COMPARATIVE EXAMPLE

First, to silica, kaolin, talc, and alumina as a cordierite-forming raw material is added a foaming resin as a pore former. Further, a binder, a dispersant, and water are added to the mixture, and the mixture is kneaded to obtain clay. Any pore former may be used as long as it scatters and disappears in the firing step. As a pore former, an inorganic substance such as carbon based substance, a high-molecular weight compound such as plastic material, or an organic substance such as starch may be used alone or in combination.

It is preferable to use, as the main raw material for a forming raw material for forming a honeycomb formed body, a composition containing, as a cordierite ceramic raw material excellent in thermal resistance and low thermal expansibility, 0 to 20% by mass of kaolin having an average particle diameter of 5 to 10 μm, 37 to 40% by mass of talc having an average particle diameter of 15 to 30 μm, 15 to 45% by mass of aluminum hydroxide having an average particle diameter of 1 to 10 μm, 0 to 15% by mass of aluminum oxide having average particle diameter of 4 to 8 μm and 10 to 20% by mass of fused silica or quartz having a particle diameter of 3 to 100 μm.

Next, using the kneaded clay-formed raw material, a honeycomb formed body is formed by extrusion forming and dried. To 100 parts by mass of a raw material powder containing the aforementioned main raw material and additives added as necessary, about 10 to 40 parts by mass of water is added, and the mixture is kneaded to obtain a mixture having plasticity. The mixture having plasticity is kneaded with a vacuum kneader to give a raw material for forming. A honeycomb formed body can be obtained by extrusion forming with a ram-type extruder. Though the thus obtained honeycomb formed body can be dried in various methods, a combination of microwave drying and hot-air drying or a combination of dielectric drying and hot-air drying is preferable. There may alternatively be employed a special method such as freeze drying, reduced-pressure drying, vacuum drying, and far-infrared radiation drying. Next, the dried honeycomb formed body is cut at both end faces to have a predetermined length.

Next, the plugging step is described. First, a film is disposed on an end face in a masking sub-step. As a film material, a polyester film (No. 631S#25 with film thickness of 50 μm, produced by Teraoka Seisakusho, Co., Ltd.) is used. An adhesive is applied on one surface of the film, and the film is applied on an end face of the honeycomb structure. Next, holes are formed in a checkerwise pattern at the opening portions of the cells at an end face where the polyester film is applied on the honeycomb structure with a laser apparatus capable of NC scanning. When the hole is formed, the periphery of the holes is swollen because the film melts.

It is preferable to use, as the main raw material of the plugging material, 0 to 20% by mass of kaolin having an average particle diameter of 1 to 20 μm, 37 to 40% by mass of talc having an average particle diameter of 5 to 60 μm, 15 to 45% by mass of aluminum hydroxide having an average particle diameter of 0.5 to 20 μm, 0 to 15% by mass of aluminum oxide having an average particle diameter of 1 to 20 μm, and 10 to 20% by mass of fused silica or quartz having a particle diameter of 1 to 200 μm as a cordierite ceramic raw material excellent in thermal resistance and low thermal expansibility from the view point of small difference in thermal expansion coefficient with the honeycomb formed body after firing. Further, the main raw material of the plugging material preferably has a similar particle size distribution as the above honeycomb formed body from the viewpoint of small difference in firing shrinkage from the honeycomb formed body. In addition, the main raw material of the plugging material preferably has a similar composition as the raw material of the above honeycomb formed body from the view-point of bringing the thermal expansion coefficient ratio of a honeycomb fired body and a plugged material fired body close to 1.

Next, a filling sub-step is described. To a cordierite-forming material are added water, a binder, a dispersant, and the like, to obtain slurry having a viscosity of about 200 dPa·s. The slurry is put in a container for plugging. A honeycomb structure with a film having holes in a checkerwise pattern being applied is put in the container under a pressure to impregnate the honeycomb structure with the slurry from holes. After the completion of the impregnation, the honeycomb structure is taken out of the container. Thus, plugged portions for plugging cells are formed at an end face of the honeycomb structure.

As a suitable method for filling the plugging material up to the same face as the end face of the honeycomb structure is, for example, a method in which the plugging material is filled one in the first place, after a tip of the plugging material is moved in the inner direction of the cell passages, the plugging material filled is dried to be solidified adequately, and further the plugging material is filled into the cells. This is based on the finding that, though the tip of the plugging material sometimes moves in the inner direction of the cell passages by the first filling, the tip of the plugging material hardly moves even if the additional plugging material is filled into the cells.

It is considered that a phenomenon that the plugging material moves in the inner direction of the cell passages is due to volume shrinkage of the plugging material with water in the plugging material being absorbed by the partition wall portions of the honeycomb structure. Therefore, the tip of the plugging material moves in the inner direction of the cell passages, and the tip is depressed in comparison with the end face. The inventors call this phenomenon surface sink. When the volume shrinkage of the plugging material is large, not only the tip of the plugging material on the end face side of the honeycomb structure, but also the tip end of the inner side of the cell passages is sometimes depressed. Generally, by filling twice, the plugging material can be filled up to the upper surface of the film or higher. However, the plugging material may be filled three times or more.

Though the plugging material can be filled up to almost the same surface as the end face of the honeycomb structure, there are a case that the plugging material slightly protrudes and a case that the plugging material slightly depresses from the end face of the honeycomb structure by the filling of the plugging material. It may be left as it is, or when it protrudes, the protruding portion may be removed to give almost the same surface as the end face. When the tip of the plugging material depresses too much, it is preferable to fill the plugging material again to make the depression smaller because soot in exhaust gas is prone to deposit in the depression. In a plurality of the above filling operations, it sometimes happens that air is drawn in the plugging material to form a void inside the plugging material. However, there is no functional problem caused in the plugging material. A void inside the plugging material is also formed by an air bubble which is mixed in the plugging material from the beginning. Therefore, it is also preferable to subject the plugging material to a degassing treatment. Though the size of the void is varied because it depends on the volume of drawn air and the size of a bubble in the plugging portion, it sometimes reaches about the size of a cell opening as an easily visible void. Even in such a case, since the plugged portions and the partition walls are unitarily joined, the function of the plugged portions can sufficiently be guaranteed.

In addition, when the tip of the plugging material moves in the inner direction of cell passages, volume shrinkage of the plugging material itself is caused. Therefore, there is sometimes caused air holes or vertical and horizontal minute cracks inside the plugged portions. However, since soot does not leak out extremely from the plugged portions as long as cracks do not pass through with widely opening from the tip of the plugged portion to the inner portion, there is no functional problem in the plugged portion. Though the size of the cracks is varied, since the plugged portions and partition walls are unitarily joined, the function of the plugged portions can sufficiently be guaranteed.

By adequately adding water by means of spraying or the like surrounding the cell inlet for filling the plugging material of the honeycomb structure before the first filling of the plugging material, the phenomenon that water in the plugging material moves inside the honeycomb structure is suppressed. Therefore, it is effective in suppressing movement of the tip of the plugging material in a cell direction, and a plurality of filling of the plugging material can be avoided.

In the case that the honeycomb structure is unfired, it is necessary to determine an adequate volume of water because the partition walls is softening and deformed if superfluous water is added. There is an effect in suppressing the movement of the tip of the plugging material in a direction of cells by adding a suitable amount of fiber material of alumina fibers or mullite fibers or a thickener to the plugging material. Addition of a superfluous amount increases viscosity of the plugging material excessively to make difficult the filling of the plugging material in cell passages. Therefore, it is necessary to determine an adequate amount of addition.

Further, there is an effect in accelerating volume shrinkage of the plugging material by a method in which pressure is applied inside the cells by air or the like from the opposite side of the cells during the above filling of the plugging material. Therefore, surface sink can be suppressed by filling the plugging material with being pressurized.

Next, in order to dry the plugging material, the plugged end face of the honeycomb structure is subjected to hot air having a temperature of 160° C. for about five minutes without peeling the film. Drying can be performed with a hot plate. The same is conducted also for the other end face to form the plugging portions at both the end faces. Then, the honeycomb structure is fired to obtain a cordierite based plugged honeycomb structure.

Partition walls of the cordierite based plugged honeycomb structure obtained practically based on the above method had a porosity of 67%, which was measured with a mercury porosimeter, and an average pore diameter of 27 μm. Each cell had a rectangular shape, partition walls had a thickness of about 0.3 mm, and the cell pitch was about 1.6 mm. The filter had a diameter of about 191 m and a length of about 200 mm. The plugged portions had a length of about 0.3 mm from an end face of the filter toward the inner direction of cell passages. Incidentally, a desired additive may be added to the ceramic material as necessary. Examples of the additive include the binders, dispersants, and pore forming materials which were specifically described above.

The plugged honeycomb structure thus produced on the basis of the present invention, as a DPF, was held under pressure by a ceramic mat (Commercial name: Interam Mat, produced by 3M) in a metallic case. Then, both end faces of the DPF was fixed with a fixing member, the fixing member was welded to the metallic case, and a cone was connected to the metallic case to produce a converter assembly. A converter assembly employing a conventional plugged honeycomb structured DPF was also produced. Then, each of the converter assemblies produced was connected to an exhaust gas system of a practical diesel engine (with a displacement of about 5 liters), and exhaust gas was sent to conduct a heating-cooling test. Each of the converter assemblies was decomposed and investigated. A trace of leakage of black smoke was recognized in an interface portion between a plugged portion of an end face of the DPF and a partition wall in the converter assembly of the conventional structure, while it was not recognized in the converter assembly of the present invention.

Further, as a result of washing with high pressure water using a Rocky Washer from an exhaust gas outlet side of the DPF, a part of the plugged portions in the exhaust gas outlet end face of the DPF was depressed from the end face toward the inner portion of the cell passages and a part of the plugged portions in the exhaust gas inlet end face of the DPF was protruded from the end face in the converter assembly of the conventional structure. On the other hand, as a result of the washing the DPF of the present invention with high pressure water in the same manner, there was no problem observed in the plugged portion at both end faces of the DPF. Further, in a washing operation with high pressure air, a similar effect was confirmed.

Figure 7:
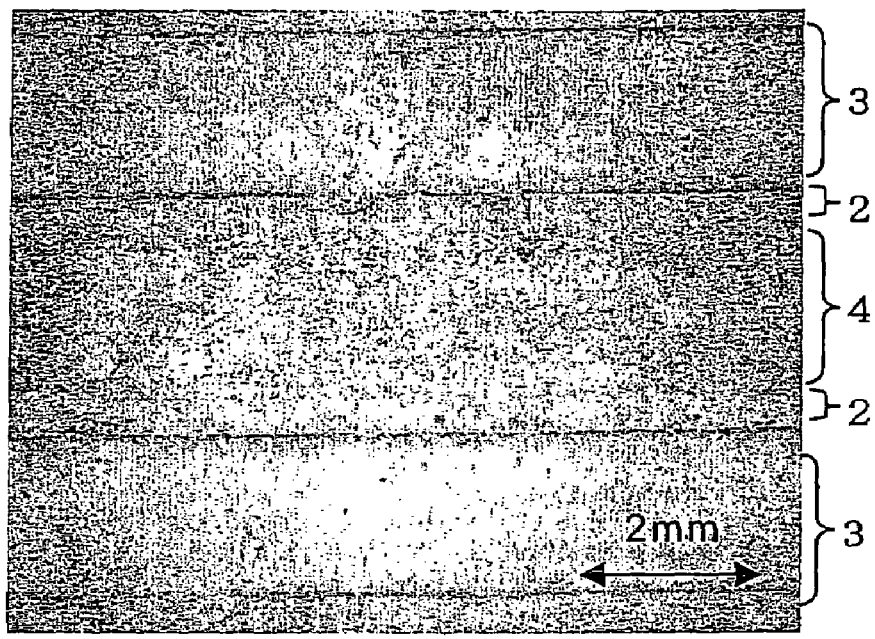
FIG. 7 is an enlarged parallel sectional photograph of a plugged honeycomb structure produced by a production method of the present invention.
Figure 8:
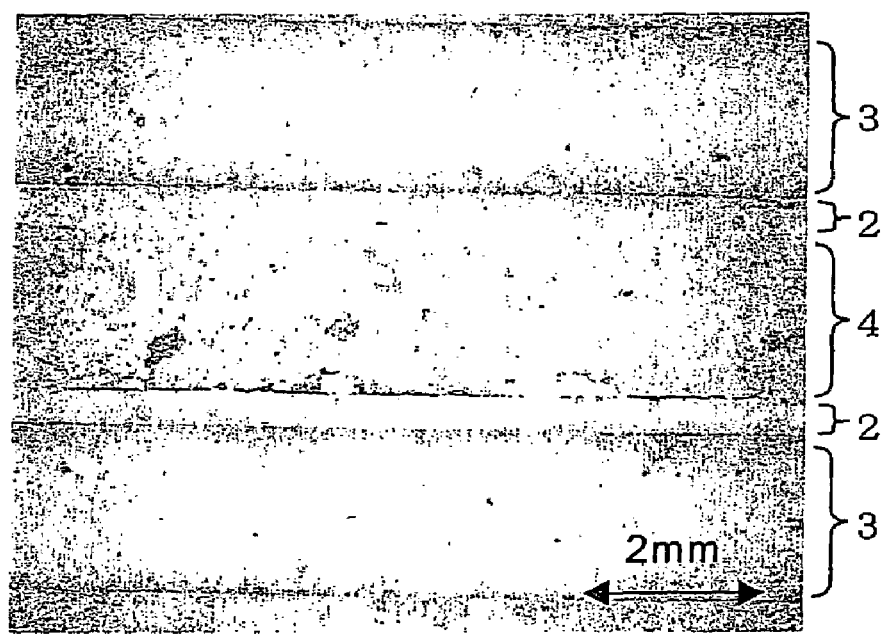
FIG. 8 is an enlarged parallel sectional photograph of a plugged honeycomb structure produced by a conventional production method.

FIG. 7 shows a photograph of a parallel section of a plugged honeycomb structured DPF (Example) produced by the method of the above present invention, and FIG. 8 shows a photograph of a parallel section of a plugged honeycomb structured DPF (Comparative Example) produced by the conventional method. From these photographs, it is understood that the plugged portion and the partition wall surrounding the plugged portion are unitarily formed in the plugged honeycomb structures DPF of Example since there is no interface line observed between the plugged portion and the partition wall and a phase extending over both the plugged portion and the partition wall is observed, while it is understand that the plugged portion and the partition wall surrounding the plugged portion are not unitarily formed in the plugged honeycomb structures DPF of Comparative Example since there is an interface line observed between the plugged portion and the partition wall. Incidentally, the plugged honeycomb structured DPF obtained in Comparative Example was produced in the same manner as in Example except for the plugging step. That is, Comparative Example refers to a method described in JP-A-57-42316, and a honeycomb structure having a diameter of 144 mm, a length of 150 mm, and a partition wall thickness of about 0.4, and a cell pitch of about 2.5 was formed and dried in completely the same manner as in Example and then fired without being plugged. Next, a honeycomb structure (fired body) was subjected to plugging using a plugging material slurry produced in completely the same manner as in Example and fired again to fire the plugging material. In this case, since the honeycomb structure was already a fired body, large shrinkage was not caused in partition walls during the second firing, and large difference is generated in shrinkage between the partition walls and the plugged portion. Even by observing the gap between the plugged portion and the partition wall from above the end face of the honeycomb structure, an interface seen in FIG. 8 cannot be observed, and the interface was not found until the section of the plugged portion was observed as in FIG. 8. As an additional confirmation test, a method referring to JP-A-2002-173381 was tested, and interface similar to that of the photograph of FIG. 8 was observed between the plugged portion and the partition wall. In this case, it is considered that the difference in shrinkage and the difficulty in adaptation due to low compatibility between the plugged portion and the partition wall influenced. Thus, in a schematic view shown in prior art, it is drawn as if an interface is not present in the contact portion between a partition wall and a plugged portion. However, it is understood that an interface is actually present in the contact portion between a partition wall and a plugged portion in conventional technique as shown by the result of observing section of FIG. 8.

INDUSTRIAL APPLICABILITY

As described above, since a plugged portion and a partition wall surrounding the plugged portion are unitarily formed in a plugged honeycomb structure of the present invention, the honeycomb structure has high strength and thermal shock resistance between the partition wall and the plugged portion and useful for various usage as a filter or the like of a DPF, etc. In addition, by a production method of the present invention, a plugged honeycomb structure having unitarily formed plugged portions and partition walls surrounding the plugged portions can easily be produced.

The invention claimed is:

1. A plugged honeycomb structure comprising:
    partition walls disposed so as to form a plurality of cells extending from one end face to the other end face in an axial direction, and
    plugged portions disposed so as to plug the cells at one of the end faces, wherein said plugged portions and said partition walls surrounding said plugged portions are unitarily formed, and have no interface line.

2. A plugged honeycomb structure according to claim 1, wherein a length of said plugged portions in a longitudinal direction of the cells is ten times as long as a cell pitch or less.

3. A plugged honeycomb structure according to claim 1, wherein the length of said plugged portions in the longitudinal direction of the cells is two times as long as a thickness of said partition walls or more.

4. A plugged honeycomb structure according to claim 2, wherein the length of said plugged portions in the longitudinal direction of the cells is two times as long as a thickness of said partition walls or more.

5. A method for producing a plugged honeycomb structure, comprising:
    a forming step of forming a forming raw material containing a solid particle (A) into a honeycomb formed body provided with a partition wall-formed body disposed so as to form a plurality of cells extending from one end face to the other end face in an axial direction,
    a plugging step of filling a plugging material containing a solid particle (B) into end portions of cells of the honeycomb formed body to form a plugged honeycomb formed body, and
    a firing step of firing the plugged honeycomb formed body to form a plugged honeycomb structure provided with partition walls formed out of the partition wall-formed body and plugged portions formed out of the plugging material;
    wherein the solid particle (A) and the solid particle (B) can unitarily be formed mutually in the firing step with no interface line, and
    a difference between rate of dimensional change (%) upon forming the plugged portions out of the plugging material and rate of dimensional change (%) upon forming the partition walls out of the partition wall-forming material is controlled to be 7% or less within the temperature range of the firing in the firing step.

6. A method for producing a plugged honeycomb structure according to claim 5, wherein the method further comprises a cooling step of cooling the plugged honeycomb structure, and a ratio of thermal expansion coefficient of the plugged portions to thermal expansion coefficient of the partition walls is made to be 0.3 to 3.0 in the temperature range of the cooling in the cooling step.

7. A method for producing a plugged honeycomb structure according to claim 5, wherein said plugging step includes a step of filling the plugging material from one end face of the honeycomb structure with pressurizing inside the cells from the other end face.

8. A method for producing a plugged honeycomb structure according to claim 5, wherein the forming raw material contains a binder, and the plugging material contains a binder compatible with the binder contained in the forming raw material.

9. A method for producing a plugged honeycomb structure according to claim 5, wherein the forming raw material contains a binder, and after the forming step, an end face of the honeycomb formed body is heated at 200° C. or more to remove at least a part of the binder, followed by conducting the plugging step at the end face.

10. A method for producing a plugged honeycomb structure according to claim 5, wherein the forming raw material is a slurry containing a dispersion medium (C), and the plugging material is a slurry containing a dispersion medium (D) compatible with the dispersion medium (C).

11. A method for producing a plugged honeycomb structure according to claim 10, wherein the honeycomb formed body is dried, subsequently, the partition wall-formed body is impregnated with the dispersion medium (C) in the vicinity of an end face, followed by conducting the plugging step at the end face.

12. A method for producing a plugged honeycomb structure according to claim 10, wherein the dispersion medium (C) and the dispersion medium (D) are hydrophobic, and the plugging step is conducted under the condition that temperature of the partition wall-formed body is higher than the normal temperature in the vicinity of an end portion.

* * * * *